United States Patent [19]
Parrish

[11] Patent Number: 6,092,295
[45] Date of Patent: Jul. 25, 2000

[54] METHOD AND APPARATUS FOR MEASURING THE THICKNESS OF RUBBER OVER A METAL REINFORCED LAYER

[75] Inventor: Gary Charles Parrish, Canal Fulton, Ohio

[73] Assignee: The Goodyear Tire & Rubber Company, Akron, Ohio

[21] Appl. No.: 09/202,703

[22] PCT Filed: Sep. 5, 1996

[86] PCT No.: PCT/US96/14245

§ 371 Date: Dec. 14, 1998

§ 102(e) Date: Dec. 14, 1998

[87] PCT Pub. No.: WO98/10240

PCT Pub. Date: Mar. 12, 1998

[51] Int. Cl.[7] .............................. G01B 5/20; G01B 5/24; G01B 3/14; B61K 9/12
[52] U.S. Cl. .......................................... 33/203; 33/203.11
[58] Field of Search ................................ 33/203, 203.11, 33/542, 203.12, 203.15

[56] References Cited

U.S. PATENT DOCUMENTS

| | | | |
|---|---|---|---|
| 1,880,802 | 10/1932 | Chilson | 33/203 |
| 2,679,715 | 6/1954 | Heintz | 33/203 |
| 3,237,310 | 3/1966 | Reiner | 33/143 |
| 3,633,279 | 1/1972 | Frazier | 33/203.12 |
| 5,238,041 | 8/1993 | Tomita et al. | 157/13 |

FOREIGN PATENT DOCUMENTS

| | | | |
|---|---|---|---|
| 679389 | 2/1964 | Canada | 33/203 |
| 2750017 | 8/1979 | Germany . | |
| 9403773 | 2/1998 | South Africa . | |

*Primary Examiner*—Randy W. Gibson
*Attorney, Agent, or Firm*—Roger D. Emerson

[57] ABSTRACT

An undertread measuring apparatus which includes a lift cylinder for rasing and lowering a sensor support assembly. The support assembly is attached to a support rod by two collars so that the assembly can rotate away upon impact and will automatically realign itself. The assembly is lowered by the lift cylinder at an angle from the vertical so that first one sensor comes into contact with the tire and then the other. The support assembly has two rollers offset from each other so that the sensor head will locate itself at the correct distance from the tire.

12 Claims, 13 Drawing Sheets

6,092,295

METHOD AND APPARATUS FOR MEASURING THE THICKNESS OF RUBBER OVER A METAL REINFORCED LAYER

TECHNICAL FIELD

This invention pertains to the art of methods and apparatuses for use in the retreading of tires, and more specifically to methods and apparatuses for measuring the thickness of rubber overlaying the belt of a tire, such as when an old tread is being ground off of a tire casing.

BACKGROUND ART

As a tire is used, the tread of the tire tends to wear off. Sometimes it is desirable to attach a new tread onto the tire casing. The process of putting a new tread on a tire casing is known as retreading. In the process of retreading, it is necessary to grind or buff the rubber overlaying the belt of the tire, known as undertread, to a specific thickness, such as $3/32$ (cm) of an inch, before attaching the new tread. Thus, an important step in the retreading process is measuring the thickness of the undertread.

Common problems often encountered in the art deal with the alignment of sensors on a buffer machine used to measure the undertread thickness. If the sensors are knocked out of alignment, for example, by a tire being mounted on a buffer machine, the operator has to realign the sensors. Also, a sequential alignment of the sensors may be desired. A sequential alignment is an alignment in which one sensor comes into operative association with the tire casing before another sensor. The prior does not disclose sequential alignment of sensors. Still another alignment problem is that sensors are displaced out of alignment when they are brought into operative association with a tire casing.

The present invention provides methods and apparatuses for measuring the undertread thickness using a sequencing, self-aligning mechanism. Thus, the alignment difficulties inherent in current undertread measuring apparatuses are overcome in a way which is simple and efficient, while providing better and more advantageous results.

DISCLOSURE OF INVENTION

The present invention, an improved undertread measuring apparatus, includes a lift cylinder which raises and lowers the undertread sensors and is attached to a support structure. This invention also includes a sensor holding plate for holding the undertread sensors and an alignment mechanism.

One advantage of the present invention is that it enables the undertread sensors to automatically realign when impacted. If, for example, while the operator was mounting a tire casing, the tire casing was to hit the undertread sensors, they would simply swing out of the way and then realign for undertread measurement.

Another advantage of the present invention is that it sequences the undertread sensors. When the operator lowers the undertread sensors, one sensor is brought into operative association with the tire, then, sequentially, another sensor is brought into operative association with the tire.

Still another advantage of the present invention is that it self-aligns the undertread sensors when they are brought into operative association with the tire casing. This self-alignment is maintained even during the rotation of the tire casing.

Still other benefits and advantages of the invention will become apparent to those skilled in the art to which it pertains upon a reading and understanding of the following detailed specification.

BRIEF DESCRIPTION OF DRAWINGS

The invention may take physical form in certain parts and arrangement of parts, a preferred embodiment of which will be described in detail in this specification and illustrated in the accompanying drawings which form a part hereof and wherein.

DETAILED DESCRIPTION OF THE INVENTION

Figure 1:
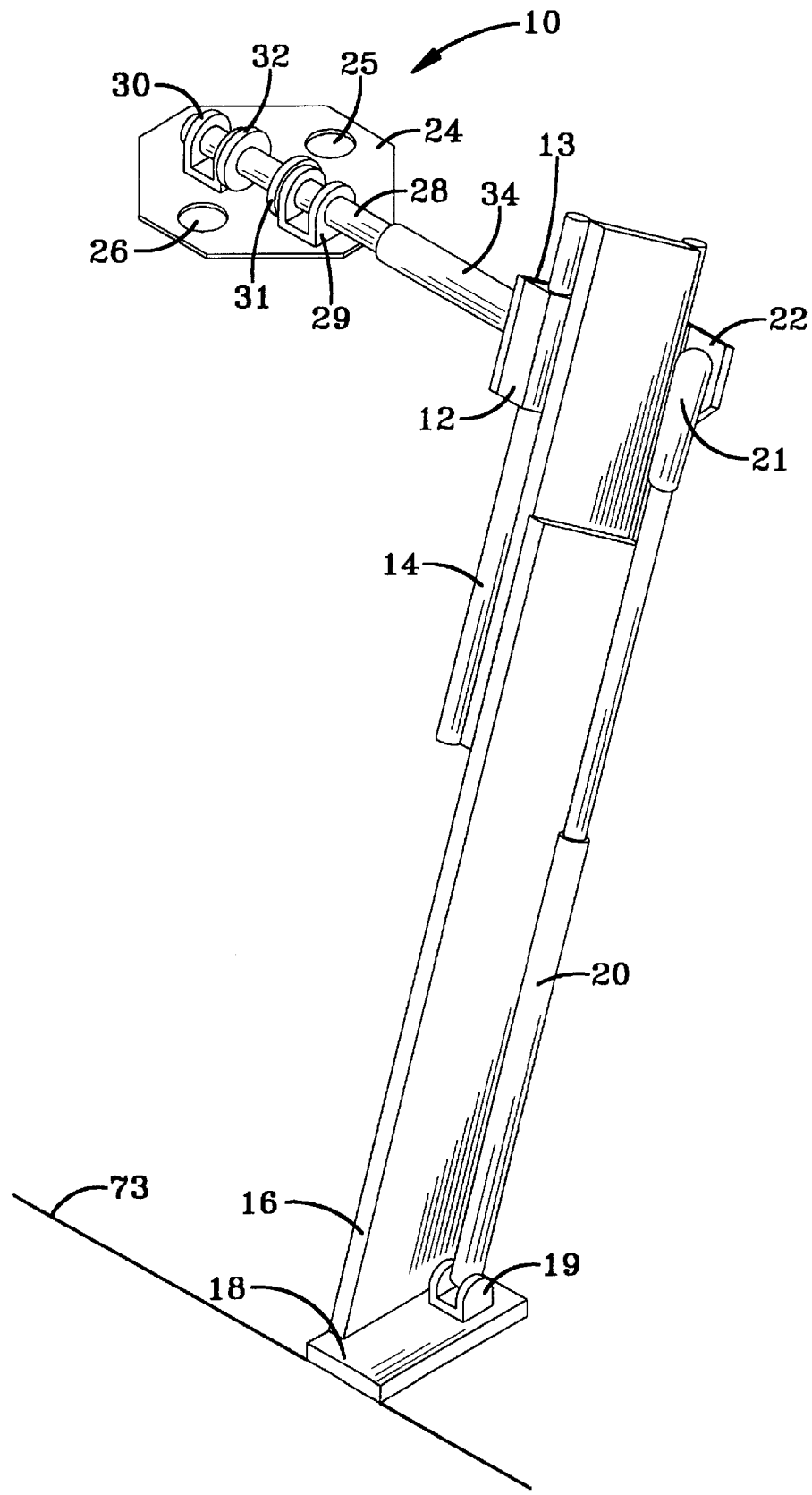
FIG. 1 is a perspective side view of an improved undertread measuring apparatus of the present invention.
Figure 2:
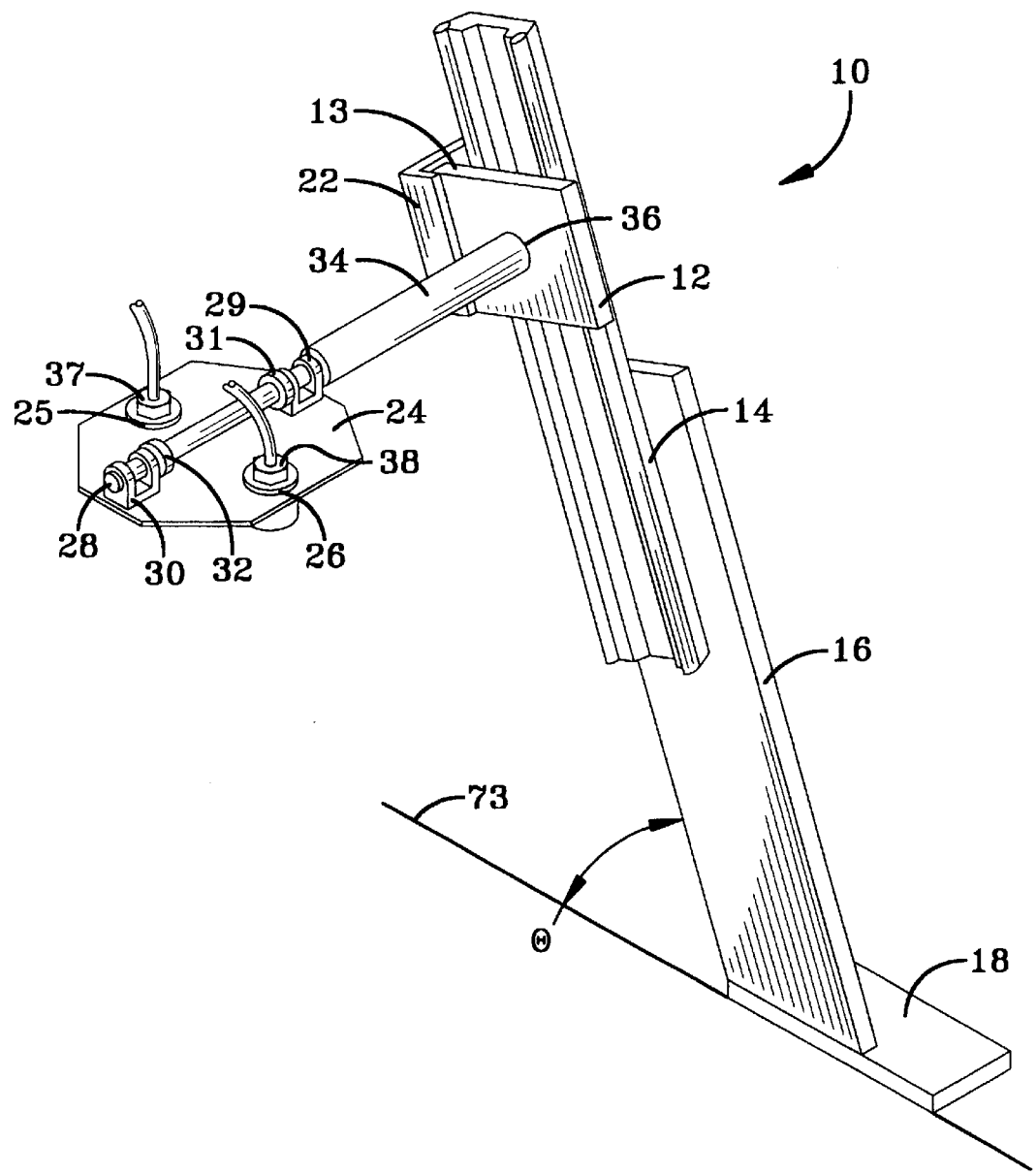
FIG. 2 is a perspective front view of the improved undertread measuring apparatus of the present invention.
Figure 3:
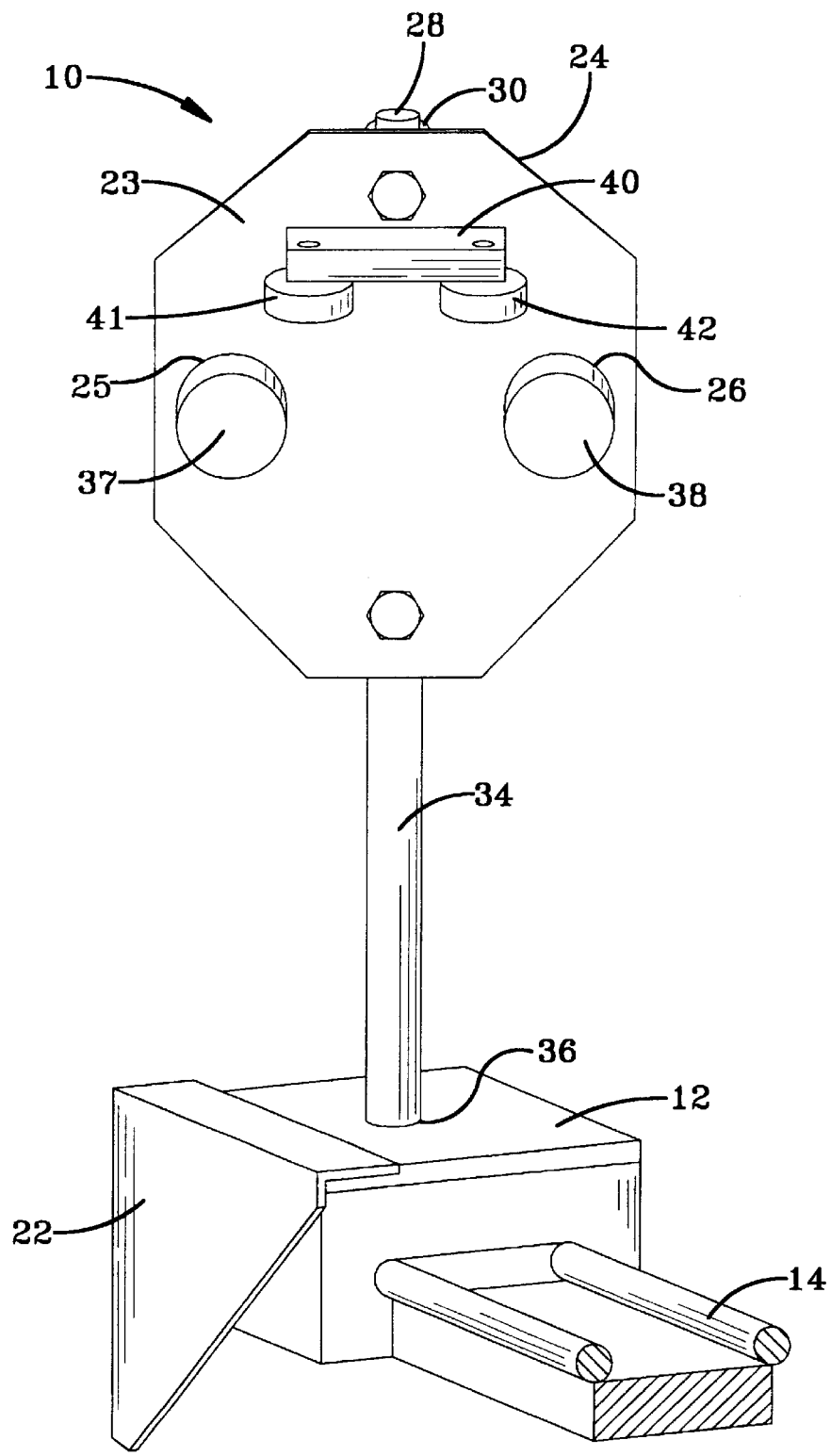
FIG. 3 is a perspective bottom view of the improved undertread measuring apparatus of the present invention.

Referring now to the drawings wherein the showings are for purposes of illustrating a preferred embodiment of the invention only and not for purposes of limiting the same, FIGS. 1–3 show an improved undertread measuring apparatus 10 for measuring the thickness of rubber overlaying the belt of a tire. This embodiment is for use on tire casings but it is also applicable to tires as well. The improved undertread measuring apparatus 10 includes a sensor-to-bearing support plate 12 which is attached to a linear bearing rail assembly 14. The linear bearing rail assembly 14 is attached to a bearing support plate 16 which is attached to a base plate 18. A lift cylinder 20 is attached at one end 19 to the base plate 18 and at the other end 21 to a lift cylinder bracket 22. The lift cylinder bracket 22 is attached to one end 13 of the sensor-to-bearing support plate 12.

A sensor holding plate 24 having a left sensor slot 25 and a right sensor slot 26 is rotatably attached to a rod 28 by a front clevis 30 and a rear clevis 29 which are held in position on the rod 28 by a front split collar 32 and a rear split collar 31. The rod 28 fits inside a steel tube 34.

Now, with reference to FIG. 2, steel tube 34 is attached to the center 36 of the sensor-to-bearing support plate 12. A left undertread sensing device 37, which may be of any type known in the art. For example an electromagnetic transducer which measures the magnetic resistance between itself and the belt of the tire is positioned inside the left sensor slot 25. A right undertread sensing device 38, which may be of any type known in the art, for example an electromagnetic transducer, which measures magnetic resistance between itself and the belt of the tire, is positioned inside the right sensor slot 26. FIG. 2 also shows that bearing support plate 16 is positioned at a less than 90° angle θ with respect to line 73 which is parallel with the base 18 and the ground or floor (not shown).

Figure 4:
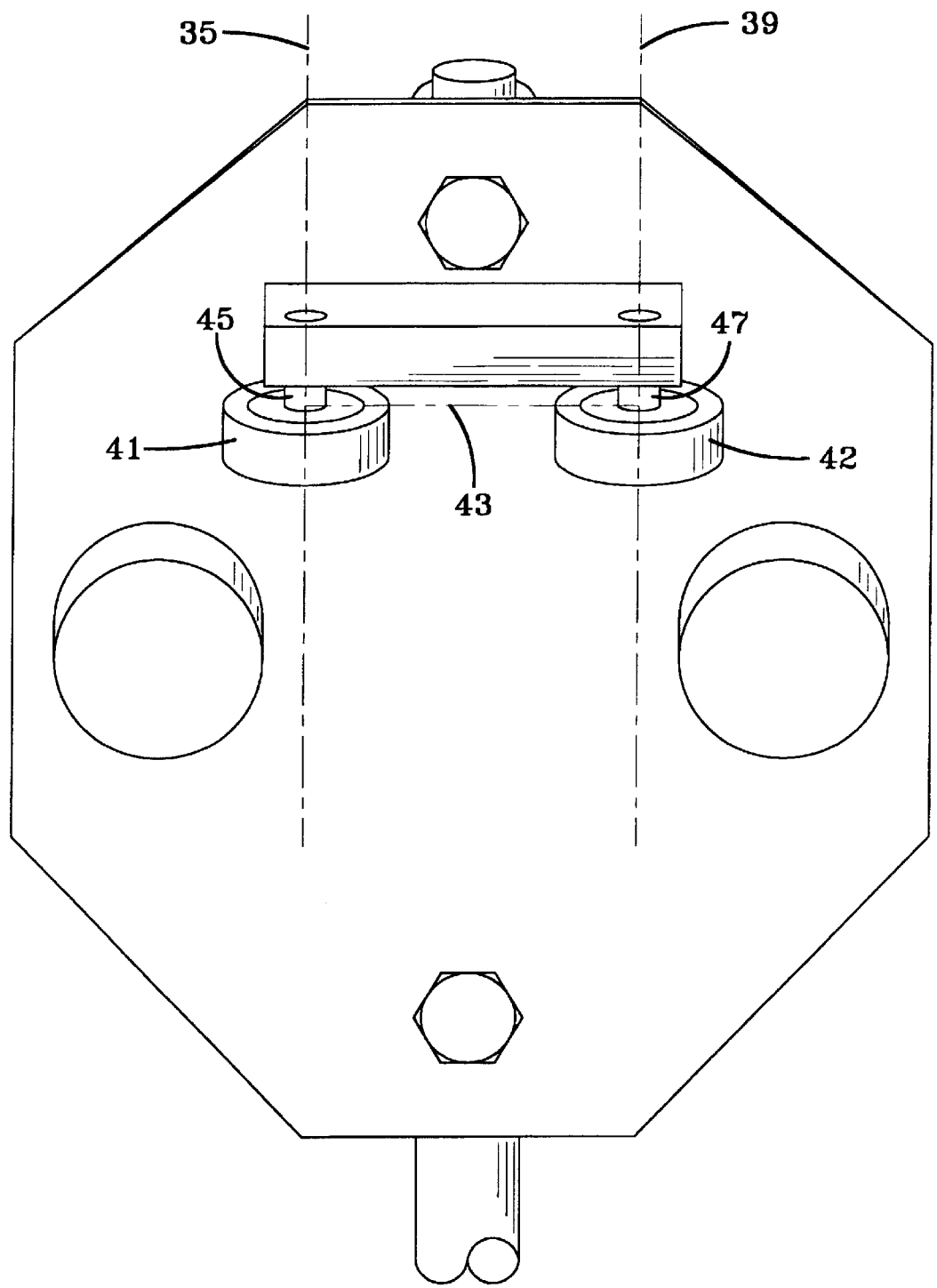
FIG. 4 is an enlarged perspective bottom view of the improved undertread measuring apparatus showing rollers positioned in line with each other.

Now, with reference to FIG. 3 which shows a bottom view of the improved undertread measuring apparatus 10, a roller bar 40 is attached to the bottom 23 of the sensor holding plate 24. Mounted to the roller bar 40, such that they can roll freely, are a left roller 41 and a right roller 42. The left roller 41 and the right roller 42 are in line with each other, as shown in FIG. 4, such that line 35 drawn along the left roller 41 axis of rotation, and line 39 drawn along the right roller 42 axis of rotation, and a third line 43 drawn between the center 45 of the left roller 41 and the center 47 of the right roller 42, are positioned such that line 43 is substantially perpendicular to line 35 and line 39.

Figure 5:
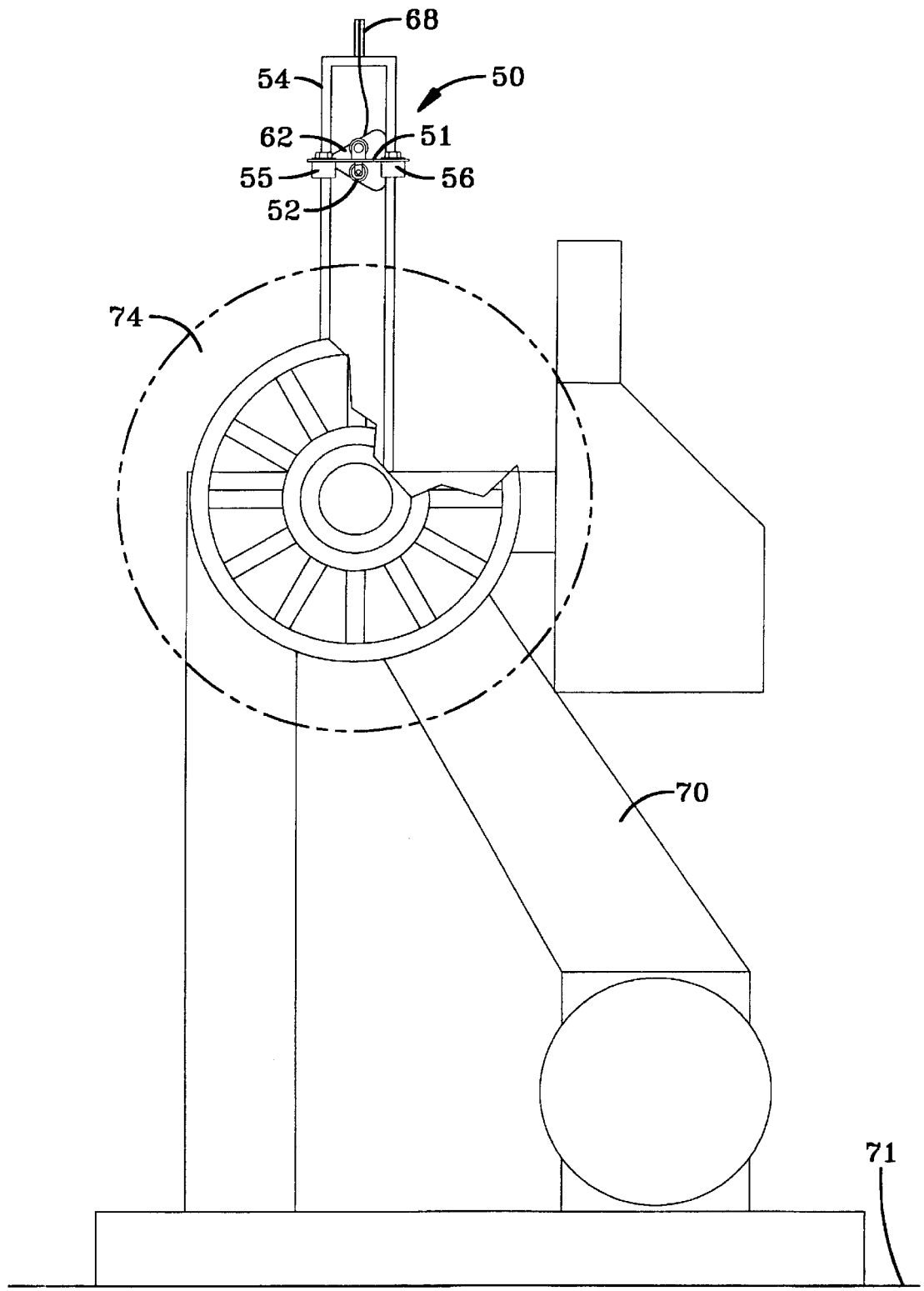
FIG. 5 is a front view of a prior art undertread measuring apparatus being used with a tire buffer machine.
Figure 6:
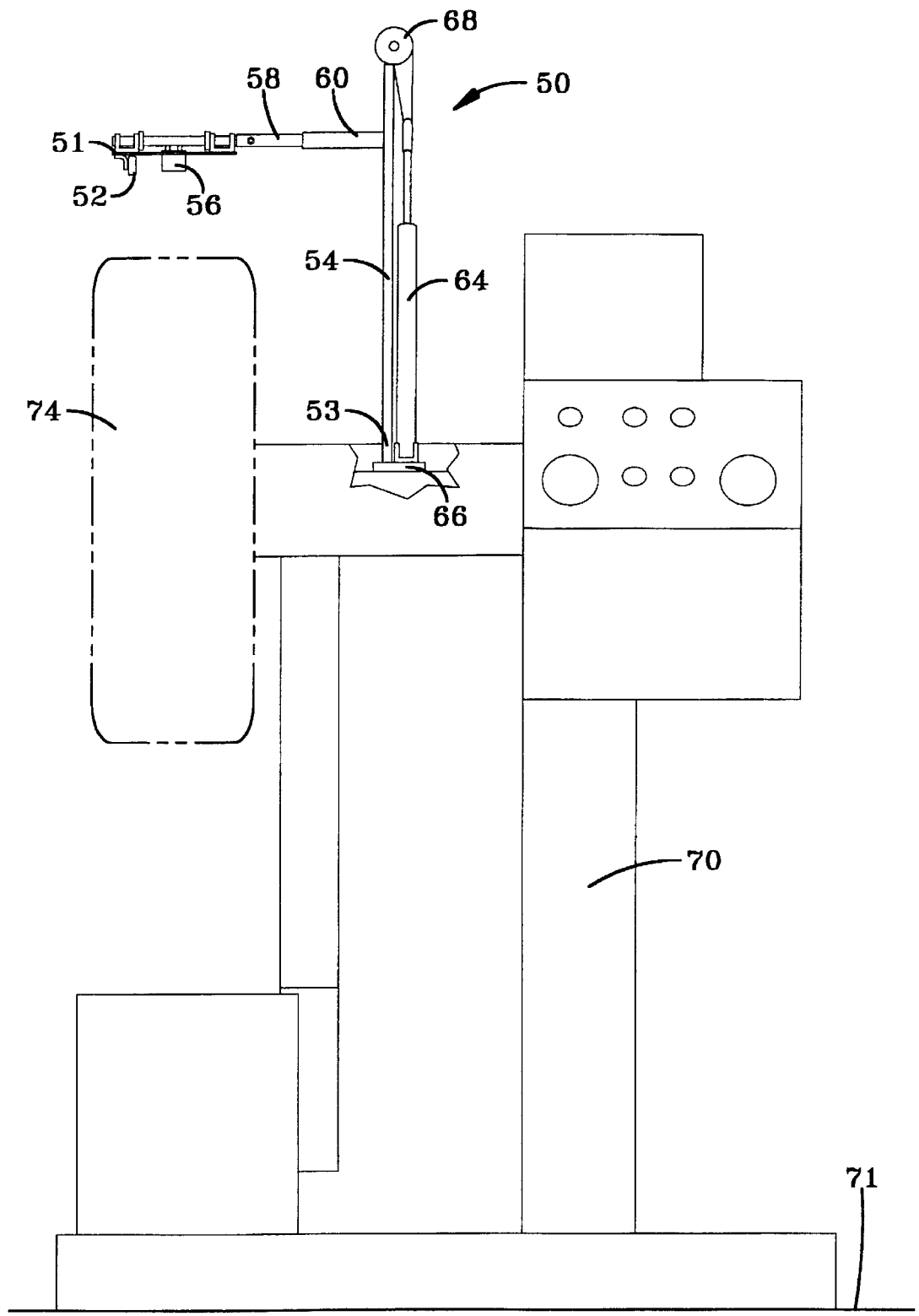
FIG. 6 is a side view of a prior art undertread measuring apparatus being used with a tire buffer machine.

FIGS. 5 and 6 show a undertread measuring apparatus 50 currently known in the art. The undertread measuring apparatus 50 includes a support assembly 54 arranged perpendicularly with respect to the ground 71, and a support bracket 51 which supports a left undertread sensing device 55, a right undertread sensing device 56, and a roller 52 for aligning the left undertread sensing device 55 and the right undertread sensing device 56 with a tire casing 74 that can rotate. The support bracket 51 is attached to a rod 58 which fits inside a metal tube 60 that is connected to a brace plate 62. A pneumatic cylinder 64 connected to a base 66 and to the brace plate 62 through a pulley system 68, positions the support bracket 51.

In the application shown in FIGS. 5 and 6, the undertread measuring apparatus 50 is being used with a tire buffer machine 70. A tire casing 74 is shown positioned on the buffer machine 70 such that the undertread measuring apparatus 50 can be used to measure its undertread thickness. In the operation of the undertread measuring apparatus 50, an operator using the pneumatic cylinder 64, lowers the support bracket 51 so that the roller 52 comes into contact with the tire casing 74. The tire casing 74 may be rotated by the tire buffer machine 70.

Figure 7:
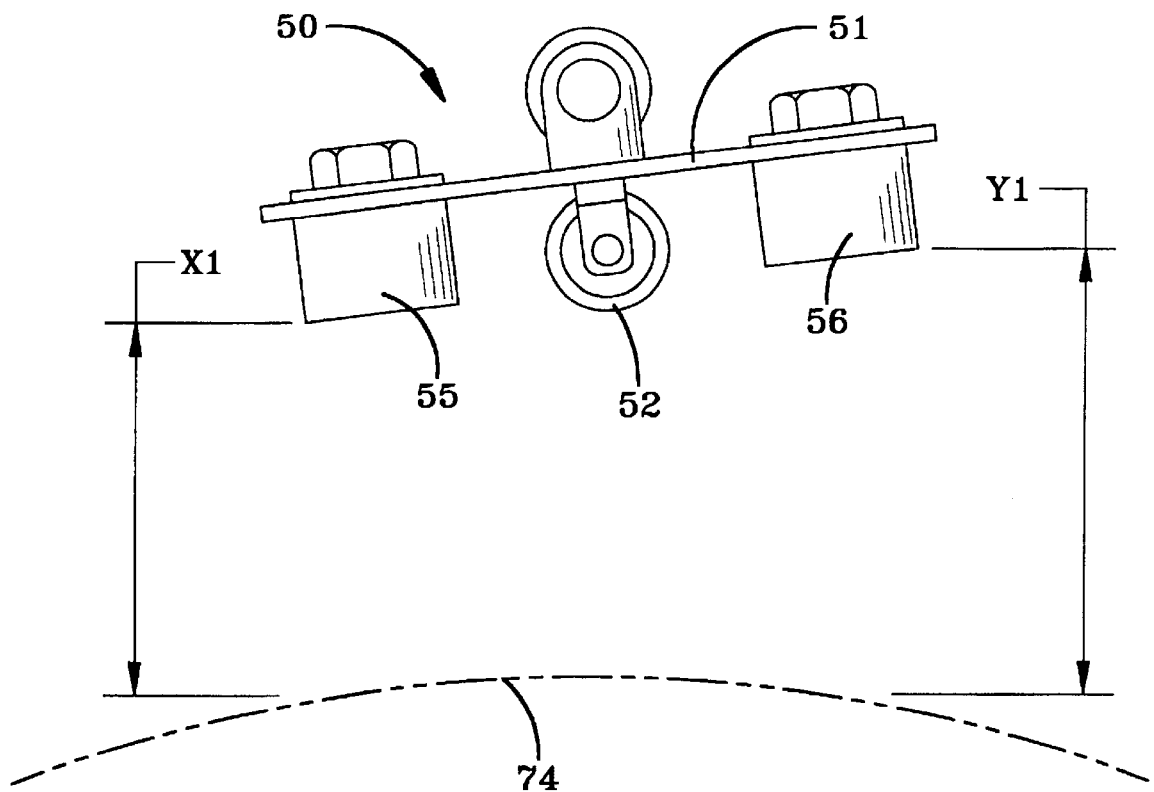
FIG. 7 is an enlarged front view of a prior art undertread measuring apparatus which has been knocked out of alignment.

There are three common alignment problems associated with the operation of the prior art undertread measuring apparatus 50. The first alignment problem is the necessity of realignment action by the human operator should the left undertread sensing device 55 and the right undertread sensing device 56 be knocked out of alignment. If, for example, the support bracket 51 was bumped by the tire casing 74 as it was being mounted onto the tire buffer machine 70, the left undertread sensing device 55 and the right undertread sensing device 56 would be knocked out of alignment. This alignment problem is illustrated in FIG. 7 which shows that the distance X1 between the left undertread sensing device 55 and the tire casing 74 and the distance Y1 between the right undertread sensing device 56 and the tire casing 74 are not the same. Thus, the operator would have to realign the left undertread sensing device 55 and the right undertread sensing device 56.

Figure 8:
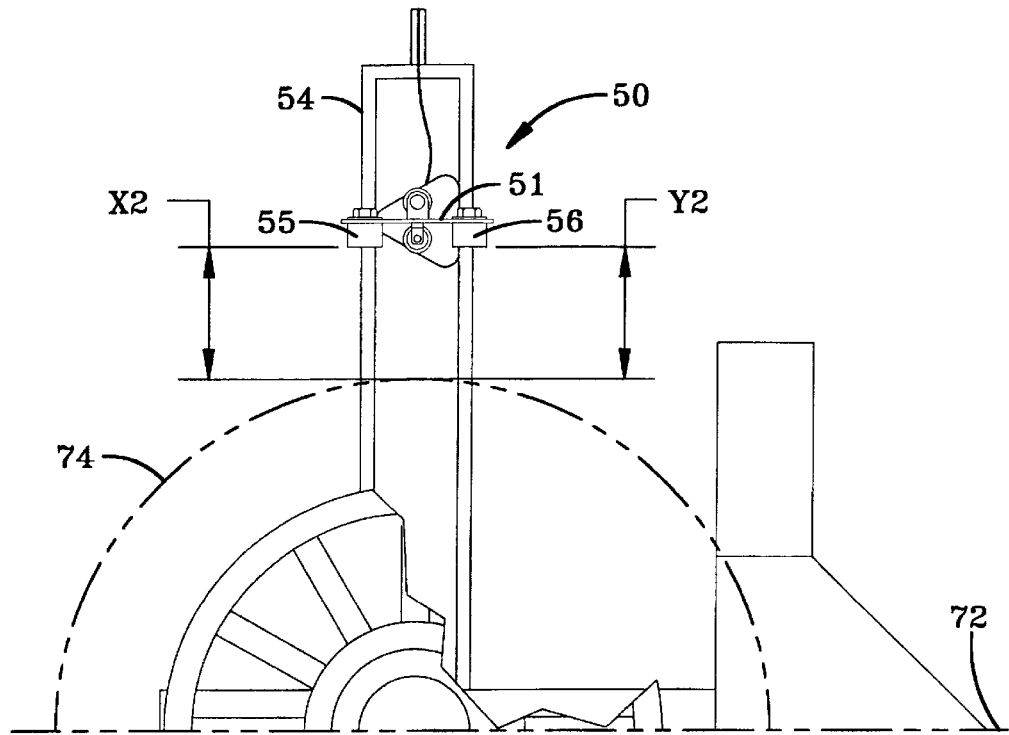
FIG. 8 is a front view of a prior art undertread measuring apparatus which cannot be aligned sequentially.

The second alignment problem, illustrated in FIG. 8, is that the left undertread sensing device 55 and the right undertread sensing device 56 cannot be aligned sequentially by the support assembly 54. A sequential alignment can be accomplished by a support assembly that allows one undertread sensing device to always come into operative association with the tire casing before the other one. However, because the support assembly 54 is perpendicular with respect to a line 72 which is parallel with the ground (not shown in FIG. 8), when the support bracket 51 is lowered by the pneumatic cylinder (not shown in FIG. 8), both the left undertread sensing device 55 and the right undertread sensing device 56 may come into operative association with the tire casing 74 at the same time. This alignment problem is illustrated in FIG. 8 which shows that the distance X2 between the left undertread sensing device 55 and the tire casing 74 and the distance Y2 between the right undertread sensing device 55 and the tire casing 74 are the same. This would result in the left undertread sensing device 55 and the right undertread sensing device 56 coming into operative association with the tire casing 74 simultaneously, not sequentially.

Figure 9:
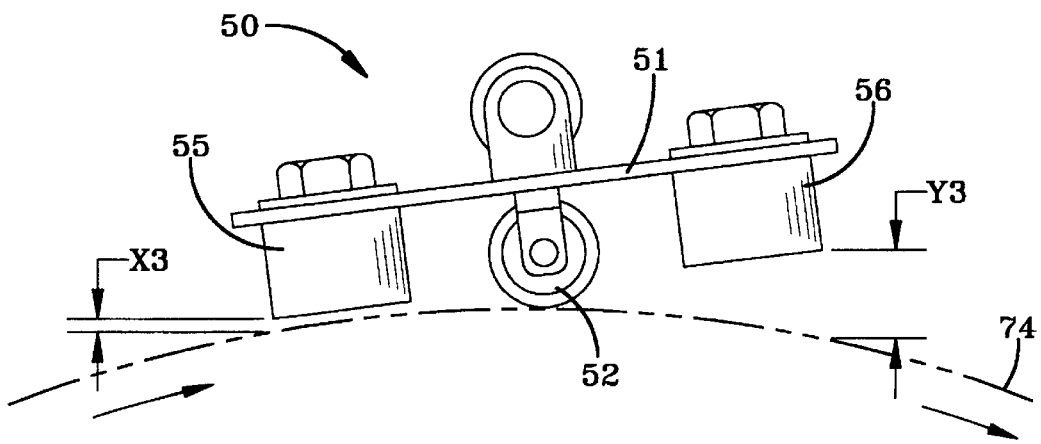
FIG. 9 is an enlarged front view of a prior art undertread measuring apparatus which pivots out of alignment.

The third common alignment problem associated with the operation of the prior art undertread measuring apparatus 50, illustrated in FIG. 9, is that the roller 52 does not ensure that the alignment of the left undertread sensing device 55 and the right undertread sensing device 56 will be maintained as the roller 52 comes into contact with the tire casing 74 and during the rotation of the tire casing 74. As the support bracket 51 is lowered, the roller 52 comes into contact with the tire casing 74. The support bracket 51 can pivot about the roller 52 causing one sensing device, for example the left undertread sensing device 55, to come into association with the tire casing 74 at a distance X3 which may be too close to the tire casing 74 for proper alignment. Thus, the left undertread sensing device 55 would be misaligned and would be likely to incorrectly measure the undertread thickness. At the same time, the other sensing device, for example the right undertread sensing device 56, would come into association with the tire casing 74 at a distance Y3 which may be too far from the tire casing 74 for proper alignment. Thus, the right undertread sensing device 56 would be misaligned and would be likely to incorrectly measure the undertread thickness.

Figure 10:
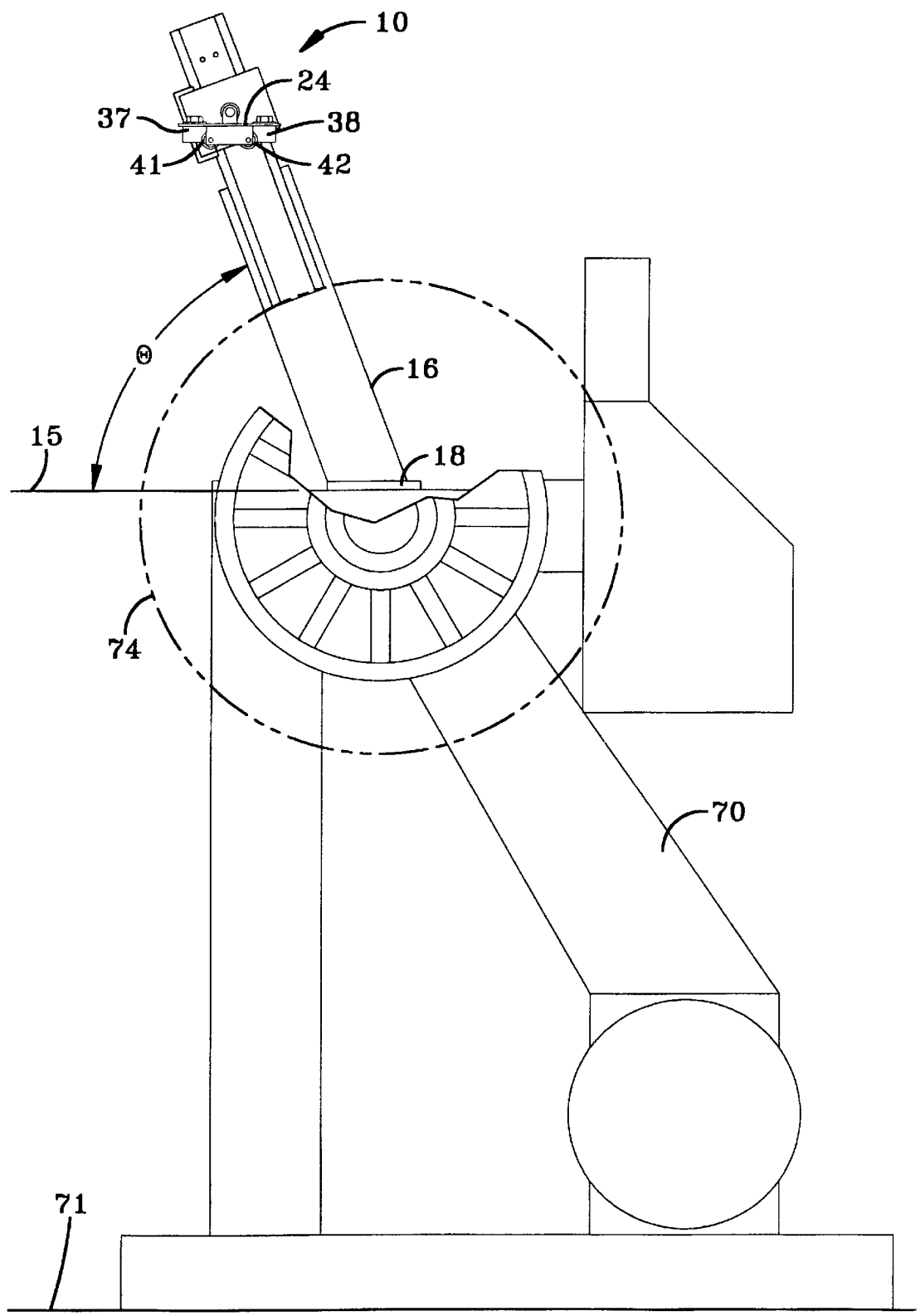
FIG. 10 is a front view of an improved undertread measuring apparatus of the present invention, being used with a tire buffer machine.

It will now be explained how the current invention, an improved undertread measuring apparatus 10, shown in FIGS. 1–3, overcomes the alignment problems of the prior art mentioned above. FIG. 10 shows an improved undertread measuring apparatus 10 being used with a tire buffer machine 70. A tire casing 74 is shown positioned on the buffer machine 70 such that the improved undertread measuring apparatus 10 can be used to measure its undertread thickness.

In the operation of the improved undertread measuring apparatus 10, referring now to FIGS. 1–3 and FIG. 10, an operator using the lift cylinder 20 lowers the sensor holding plate 24 toward the tire casing 74.

The problem of having the sensing devices knocked out of alignment and thus requiring operator input to realign, known in the prior art and discussed above, is overcome by the improved undertread measuring apparatus 10. FIGS. 1 and 2 show that the sensor holding plate 24 is rotatably attached to rod 28 by a front clevis 30 and a rear clevis 29. This rotatable attachment allows the sensor holding plate 24 to freely rotate about rod 28. Thus, if the sensor holding plate 24 was struck by a tire casing as it was being mounted by the operator, the sensor holding plate 24 would simply swing out of the way and then gravity would bring it back into proper alignment, parallel with a line 73 which is parallel with the ground (not shown in FIGS. 1 and 2), without operator input.

Figure 11:
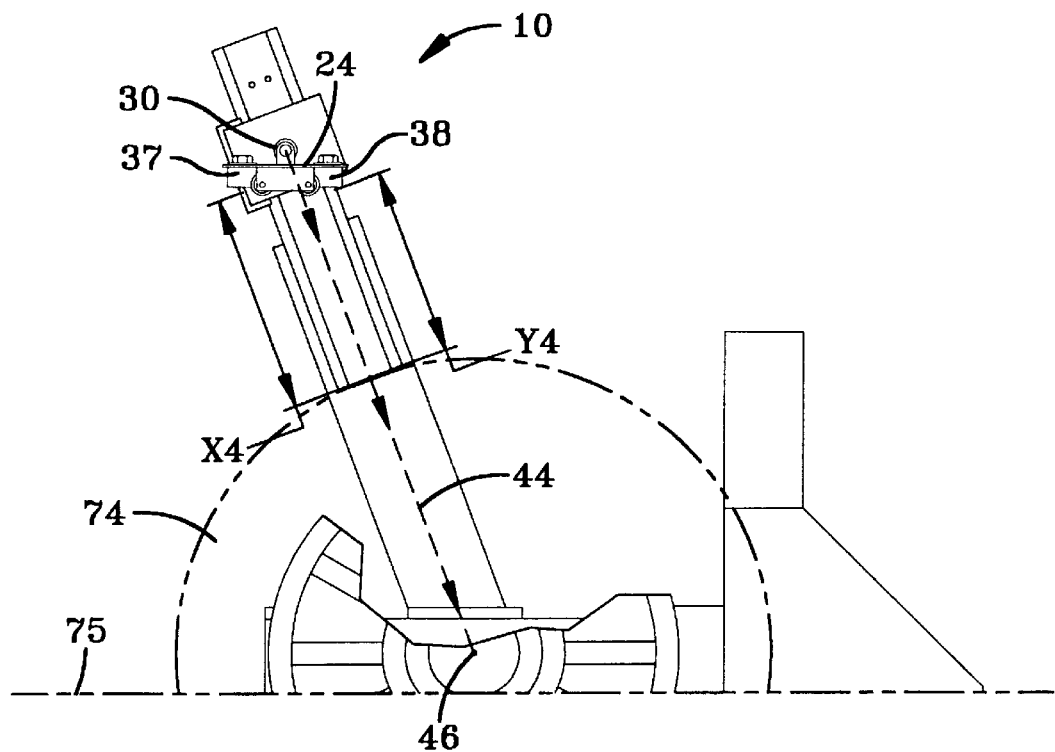
FIG. 11 is a front view of an improved undertread measuring apparatus of the present invention, showing sequential alignment.

The problem of not having a sequential alignment, known in the prior art and discussed above, is also overcome by the improved undertread measuring apparatus 10. As seen in FIG. 10, the bearing support plate 16 is attached to the base plate 18 at a less than 90° angle θ with respect to the ground 71 or with respect to a line 15 parallel with the ground 71. In FIG. 2 this angle θ is shown with respect to line 73 which is parallel with the ground (not shown). This arrangement assures that as the sensor holding plate 24 is lowered, the right undertread sensing device 38 comes into operative association with the tire casing 74 first, then sequentially, the left undertread sensing device 37 would come into operative association with the tire. This sequential alignment is illustrated in FIG. 11 which shows that as the sensor holding plate 24 is lowered, it moves along a radial line 44 toward the center 46 of the tire casing 74. The sensor holding plate 24 remains positioned parallel with line 75 which is parallel with the ground (not shown in FIG. 11) due to the force of gravity and the rotating attachment between the holding plate 24 and the rod 28. As shown in FIGS. 1 and 2, the rotating attachment is effected by the rear clevis 29 and the front clevis 30. FIG. 11 shows only the front clevis 30.

Referring again to FIG. 11, the distance X4 between the left undertread sensing device 37 and the tire casing 74 is larger than the distance Y4 between the right undertread sensing device 38 and the tire casing 74. Thus, the right undertread sensing device 38 would come into operative association with the tire casing 74 then, sequentially, the left undertread sensing device 37 would come into operative association with the tire casing 74.

Figure 12:
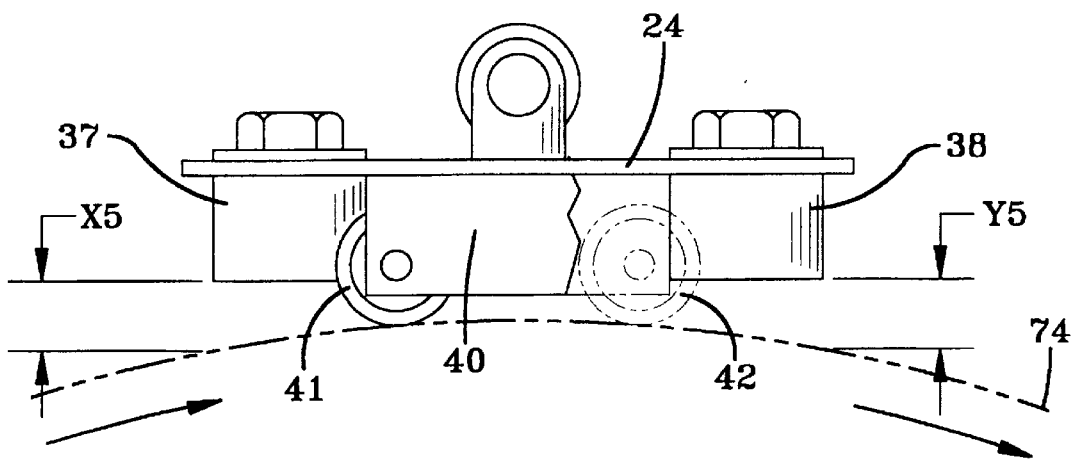
FIG. 12 is an enlarged front view of an improved undertread measuring apparatus of the present invention, showing how the rollers prevent the undertread sensing devices from pivoting out of alignment.

The alignment problem caused by the support bracket pivoting about the roller, known in the prior art and discussed above, is also overcome by the improved undertread measuring apparatus 10. As shown in FIG. 3 and FIG. 12, the improved undertread measuring apparatus 10 has a roller bar 40 with a left roller 41 and a right roller 42. As the sensor holding plate 24 is lowered, first the right roller 42 then the left roller 41 come into contact with the tire casing. The rollers are sequenced, first the right roller 42 then the left roller 41, just as the right undertread sensing device 38 and the left undertread sensing device 37 are sequenced. This is shown in FIG. 11 and discussed above.

Referring now to FIG. 12, since there are two rollers, a right roller 42 and a left roller 41, once they come into contact with the tire casing 74, which may rotate, the right undertread sensing device 38 and the left undertread sensing device 37 are automatically put into proper alignment without the sensor holding plate 24 pivoting out of alignment. Thus, the distance X5 between the left undertread sensing device 37 and the tire casing 74, and the distance Y5 between the right undertread sensing device 38 and the tire casing 74 are always the correct distances for proper alignment.

Figure 13:
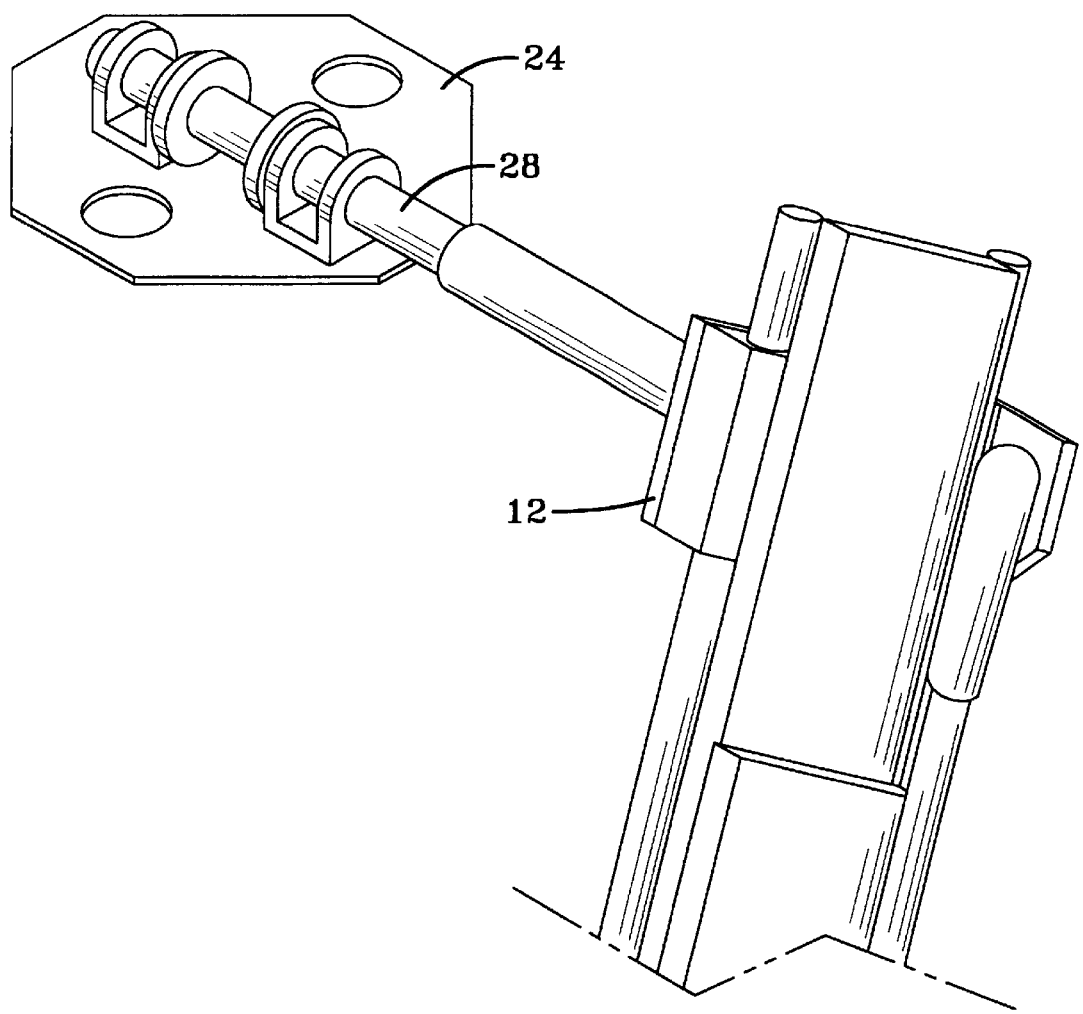
FIG. 13 is a perspective side view of another embodiment of this invention which does not require a steel tube.

An application may arise where the lateral adjustments possible with steel tube 34 are not necessary, for example in the event of a standard size tire. In such case, the lateral distance will be constant. In another embodiment of this invention, shown in FIG. 13, the rod 28 on which the sensor holding plate 24 rotates is directly attached to the sensor-to-bearing support plate 12. In this embodiment, rod 28 is not extensible along its length. Minor length adjustments can be made with the collars 31,32. In this embodiment, no steel tube 34, as shown in FIG. 1, is required.

Figure 14:
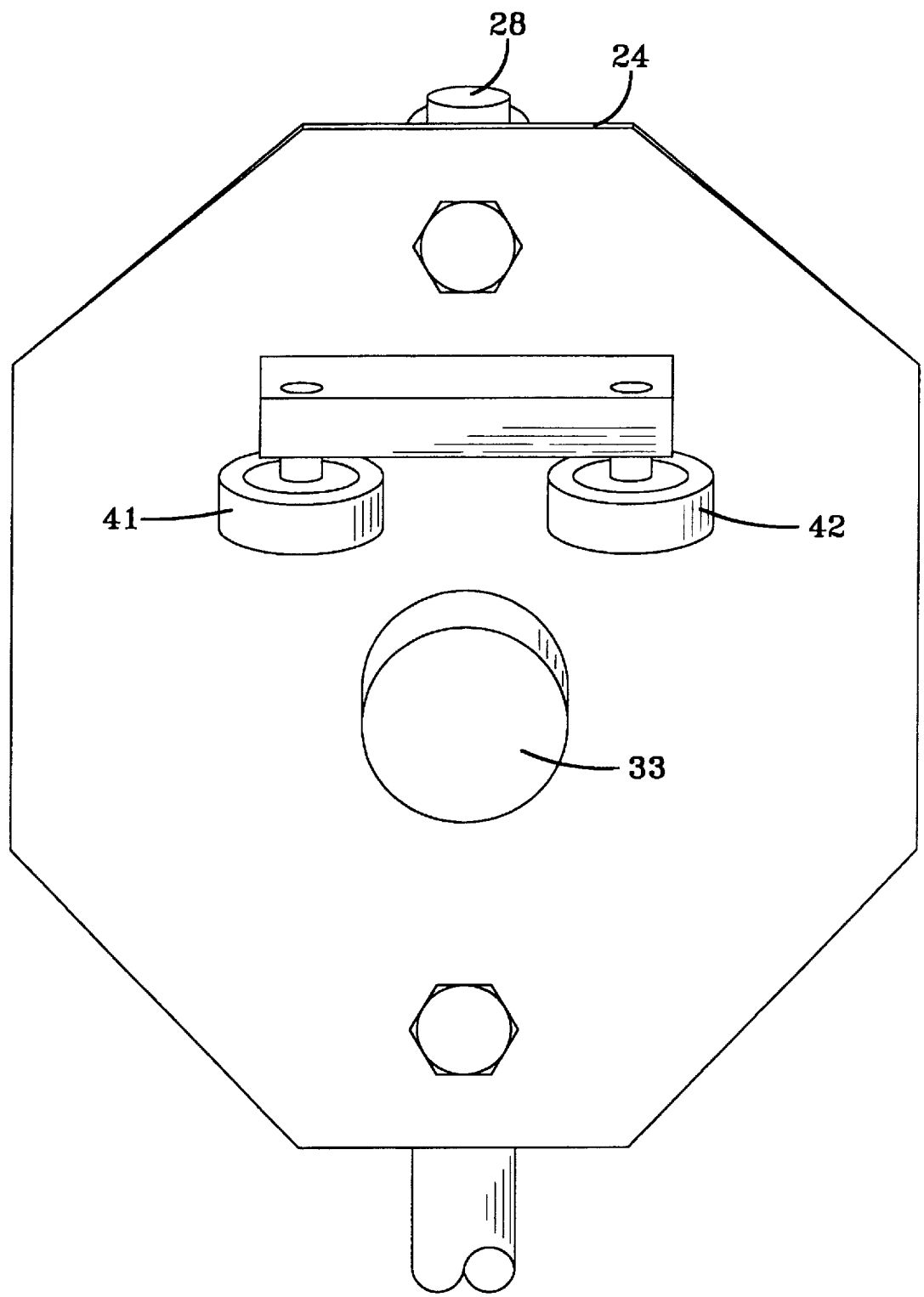
FIG. 14 is an enlarged perspective bottom view of another embodiment of this invention which has one undertread sensing device; and, FIG. 15 is an enlarged perspective bottom view of another embodiment of this invention in which the rollers are not in line with each other.

In another embodiment of this invention, shown in FIG. 14, only one undertread sensing device 33 is used. This undertread sensing device 33 could be of any type known in the art, for example an electromagnetic transducer which measures the magnetic resistance between itself and the belt of the tire.

Figure 15:
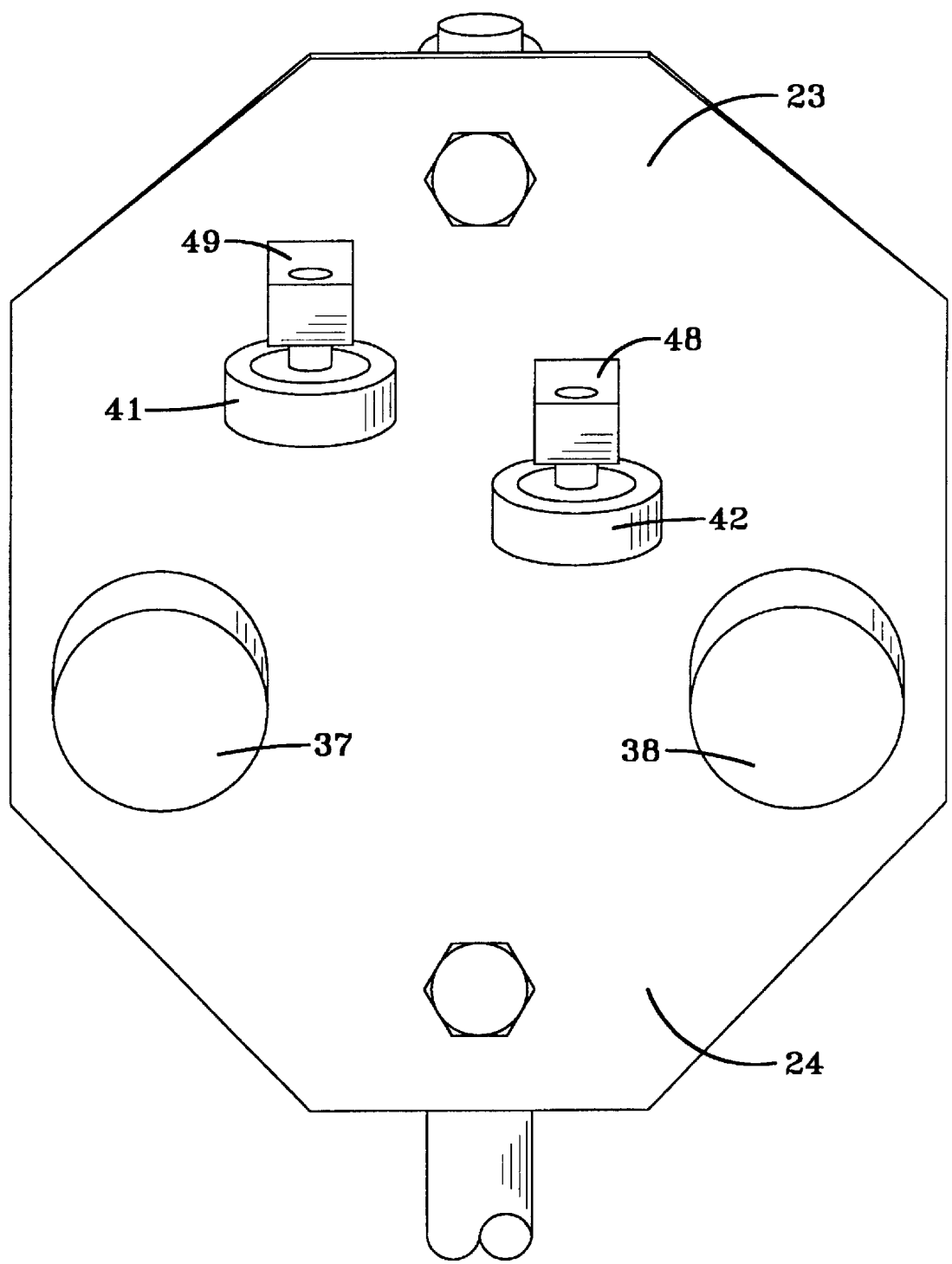

In still another embodiment of this invention, shown in FIG. 15, the left roller 41 and the right roller 42 are not in line with each other. In this embodiment one roller, for example the right roller 42, is located forwardly and laterally of the other roller, for example the left roller 41. A left roller bar 49 is attached to the bottom 23 of the sensor holding plate 24 with the left roller 41 mounted to it such that the left roller 41 can roll freely. A right roller bar 48 is attached to the bottom 23 of the sensor holding plate 24 with the right roller 42 mounted to it such that the right roller 42 can roll freely.

The preferred embodiments have been described, herein above. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. An apparatus to measure the thickness of rubber overlaying the belt of an associated tire, the apparatus comprising first sensing means for sensing the thickness of rubber overlaying the belt of the tire, sensor holding means for holding said first sensor, positioning means for positioning said sensing means, and supporting means for supporting said first sensing means and said positioning means, the apparatus being characterized by:

self-aligning means for self-aligning said first sensing means, the self-aligning means including a rod having first and second ends, said first end of said rod being fixedly connected to said supporting means; rotating attachment means fixedly attached to said sensor holding means and rotatably attached to said second end of said rod to permit free rotation of said sensor holding means about said rod; and first and second rollers fixedly connected to said sensor holding means, the first and second rollers being free-rolling.

2. The apparatus of claim 1 further characterized by:

second sensing means for sensing the thickness of rubber overlaying the belt of the tire, said second sensing means cooperating with said first sensing means, said sensor holding means holding said first sensing means and said second sensing means.

3. The apparatus of claim 1 wherein said first roller is located forwardly and laterally of said second roller.

4. The apparatus of claim 1 wherein said first roller is substantially in line with said second roller.

5. The apparatus of claim 2 further characterized by:

said supporting means cooperates with said rod, said sensor holding means, and said rotating attachment means to provide a sequencing arrangement for placing said second sensing means into operative association with the tire after said first sensing means comes into operative association with the tire.

6. The apparatus of claim 5 wherein said supporting means comprises:
   a base located laterally of the tire; and,
   an angled member having a lower end and an upper end, said lower end of said angle member fixedly attached to said base, said angled member making an angle other than 90° with respect to the ground.

7. The apparatus of claim 1 wherein said first sensing means is a first electromagnetic transducer for measuring magnetic resistance between said first electromagnetic transducer and the belt of the tire.

8. The apparatus of claim 2 wherein said first sensing means is a first electromagnetic transducer for measuring magnetic resistance between said first electromagnetic transducer and the belt of the tire and said second sensing means is a second electromagnetic transducer for measuring magnetic resistance between said second electromagnetic transducer and the belt of the tire.

9. The apparatus of claim 1 wherein said positioning means comprises a first lift cylinder.

10. A method for automatically re-aligning a device knocked out of alignment by a force, said device used with an associated tire, said device cooperating with supporting means for supporting said device, a rod having a first end and a second end, said first end of said rod fixedly connected to said supporting means, said second end of said rod extending over the tire, device holding means for holding said device, and rotating attachment means, said rotating attachment means fixedly attached to said device holding means, said rotating attachment means rotatably attached to said second end of said rod, said method characterized by the steps of:
   aligning said device; and,
   applying a force to said device or said device holding means, said holding means rotating in a direction corresponding to said force around said second end of said rod, said holding means then in response to the effects of gravity rotating in an opposite direction around said second end of said rod, said holding means in continuing response to the effects of gravity continuing to rotate in a direction corresponding to said force then in the opposite direction until said device holding means stops rotating.

11. A method for sequencing first and second devices used with an associated tire, said first and second devices cooperating with positioning means for positioning said first and second devices, supporting means for supporting said first and second devices and said positioning means, said supporting means having a base located laterally of the tire, an angled member having a lower end and an upper end, said lower end of said angled member fixedly attached to said base, said angled member making an angle other than 90° with respect to the ground, a rod having a first end and a second end, said first end of said rod fixedly connected to said supporting means, said second end of said rod extending over the tire, device holding means for holding said first and second devices, rotating attachment means, said rotating attachment means fixedly attached to said device holding means, said rotating attachment means rotatably attached to said second end of said rod, and first and second rollers, said first and second rollers fixedly connected to said device holding means, said first and second rollers being free-rolling, said method characterized by the steps of:
   lowering said device holding means toward the tire with said positioning means until said first roller contacts the tire, said first device coming into operative association with the tire; and,
   continuing to lower said device holding means, said device holding means rotating around said second end of said rod until said second roller contacts the tire, said second device coming into operative association with the tire.

12. A method for self-aligning a first device used with an associated tire, said first device cooperating with positioning means for positioning said first device, supporting means for supporting said first device and said positioning means, a rod having a first end and a second end, said first end of said rod fixedly connected to said supporting means, said second end of said rod extending over the tire, device holding means for holding said first device, rotating attachment means, said rotating attachment means fixedly attached to said device holding means, said rotating attachment means rotatably attached to said second end of said rod, and first and second rollers, said first and second rollers fixedly connected to said device holding means, said first and second rollers being free-rolling, said method characterized by the steps of:
   lowering said device holding means toward the tire with said positioning means until said first roller contacts the tire; and,
   continuing to lower said device holding means, said device holding means rotating around said second end of said rod until said second roller contacts the tire, said first device coming into proper alignment.

* * * * *